(12) United States Patent
Büchele et al.

(10) Patent No.: US 12,442,708 B2
(45) Date of Patent: Oct. 14, 2025

(54) METHOD FOR OPERATING A PRESSURE MEASURING CELL OF A CAPACITIVE PRESSURE SENSOR

(71) Applicant: IFM Electronic GmbH, Essen (DE)

(72) Inventors: Simon Büchele, Eriskirch (DE); Peter Kimbel, Tettnang (DE)

(73) Assignee: IFM Electronic GmbH, Essen (DE)

( * ) Notice: Subject to any disclaimer, the term of this patent is extended or adjusted under 35 U.S.C. 154(b) by 322 days.

(21) Appl. No.: 18/118,079

(22) Filed: Mar. 6, 2023

(65) Prior Publication Data

US 2023/0288282 A1    Sep. 14, 2023

(30) Foreign Application Priority Data

Mar. 10, 2022   (DE) .......................... 102022105693.7

(51) Int. Cl.
*G01L 27/02* (2006.01)
*G01L 9/12* (2006.01)
*G01L 27/00* (2006.01)

(52) U.S. Cl.
CPC .............. *G01L 27/002* (2013.01); *G01L 9/12* (2013.01)

(58) Field of Classification Search
CPC . G01L 9/0075; G01L 19/0645; G01L 9/0072; G01L 19/147; G01L 19/14; G01L 13/025; G01L 19/0084; G01L 19/0038; G01L 19/04; G01L 19/0046; G01L 19/0618; G01L 19/148; G01L 19/125;

(Continued)

(56) References Cited

U.S. PATENT DOCUMENTS 3,753,373 A * 8/1973 Brown ................... G01P 15/125
    73/753
11,630,012 B2 * 4/2023 Slogsnat ............... G01L 9/0072
    73/724

(Continued)

FOREIGN PATENT DOCUMENTS

DE          102010062622 A1 *  6/2012  ............. G01L 25/00
DE       10 2019 129 264 A1     5/2021

(Continued)

*Primary Examiner* — Andre J Allen
(74) *Attorney, Agent, or Firm* — Patent Technologies, LLC; Robert D. Gunderman, Jr.

(57) ABSTRACT

A method for operating a pressure measuring cell of a capacitive pressure sensor. The pressure measuring cell includes a pressure-dependent measuring capacitor and a reference capacitor, with an internal alternating square wave excitation voltage applied. The pressure measured value is obtained from capacitance values of the measuring capacitor and the reference capacitor. The measurement signal is an alternating square-wave signal supplied to an evaluation unit. The alternating square-wave signal is supplied to an amplifier unit where signal amplification is performed by amplitude adjustment for the internal excitation voltage and offset compensation is performed by a further square-wave signal and gain correction is performed by multiplicative influencing of the quotient of the capacitance values of the reference capacitor and the measuring capacitor, and the offset correction is performed by virtue of the square-wave signal being supplied to the amplifier unit and thus being added to the square-wave signal.

8 Claims, 4 Drawing Sheets

(58) Field of Classification Search
CPC . G01L 19/143; G01L 19/0092; G01L 27/007; G01L 19/0627; G01L 19/142; G01L 9/12; G01L 9/0051; G01L 3/026; G01L 9/00; G01L 19/0007; G01L 19/0672; G01L 9/0048; G01L 19/0069; G01L 9/0044; G01L 19/02; G01L 19/146; G01L 19/003; G01L 19/0654; G01L 19/06; G01L 19/0023; G01L 19/0663; G01L 9/0079; G01L 9/0052; G01L 19/0061; G01L 9/0055; G01L 19/141; G01L 19/00; G01L 19/0681; G01L 19/144; G01L 19/0609; G01L 27/002; G01L 19/145; G01L 9/0041; G01L 9/0042; G01L 9/0073; G01L 9/06; G01L 1/02; G01L 9/065; G01L 13/02; G01L 9/04; G01L 15/00; G01L 19/0636; G01L 7/082; G01L 19/083; G01L 9/0045; G01L 21/00; G01L 19/069; G01L 21/34; G01L 25/00; G01L 11/00; G01L 9/006; G01L 13/00; G01L 13/06; G01L 7/08; G01L 1/205; G01L 23/18; G01L 7/00; G01L 5/0052; G01L 1/20; G01L 21/12; G01L 27/00; G01L 9/0001; G01L 27/005; G01L 9/0054; G01L 1/142; G01L 11/02; G01L 1/26; G01L 19/12; G01L 21/30; G01L 9/007; G01L 9/0083; G01L 9/02; G01L 1/04; G01L 1/2281; G01L 19/0076; G01L 19/149; G01L 9/0002; G01L 1/18; G01L 23/28; G01L 9/0064; G01L 9/025; G01L 1/144; G01L 19/0015; G01L 9/0005; G01L 9/003; G01L 9/008; G01L 9/0089; G01L 1/2206; G01L 17/005; G01L 2009/0066; G01L 5/12; G01L 9/0008; G01L 9/0058; G01L 9/0091; G01L 9/08; G01L 11/006; G01L 23/08; G01L 9/045; G01L 1/16; G01L 21/32; G01L 5/24; G01L 7/18; G01L 9/086; G01L 1/2268; G01L 7/084; G01L 9/077; G01L 1/2256; G01L 1/2262; G01L 11/025; G01L 23/125; G01L 9/0026; G01L 9/0076; G01L 9/0092; G01L 9/085; G01L 1/2231; G01L 1/2243; G01L 2009/0063; G01L 5/0028; G01L 5/04; G01L 5/162; G01L 7/04; G01L 7/182; G01L 9/0047; G01L 9/16; G01L 1/2293; G01L 1/246; G01L 11/04; G01L 21/16; G01L 21/24; G01L 23/10; G01L 25/003; G01L 5/00; G01L 5/0038; G01L 5/0076; G01L 5/243; G01L 1/22; G01L 1/2225; G01L 1/255; G01L 19/08; G01L 2019/0053; G01L 3/1478; G01L 5/0061; G01L 5/06; G01L 5/08; G01L 5/136; G01L 5/1623; G01L 5/22; G01L 5/225; G01L 5/228; G01L 7/088; G01L 7/14; G01L 7/163; G01L 9/0016; G01L 9/0027; G01L 9/0032; G01L 9/0095; G01L 9/105; G01L 1/00; G01L 1/183; G01L 1/2287; G01L 2009/0069; G01L 23/24; G01L 27/02; G01L 5/106; G01L 5/16; G01L 5/161; G01L 5/226; G01L 7/166; G01L 9/0036; G01L 9/0085; G01L 1/042; G01L 1/125; G01L 1/247; G01L 13/023; G01L 13/028; G01L 19/10; G01L 23/00; G01L 23/22; G01L 23/222; G01L 23/225; G01L 3/02; G01L 3/104; G01L 5/0009; G01L 5/0042; G01L 5/0057; G01L 5/101; G01L 5/102; G01L 5/107; G01L 5/108; G01L 5/282; G01L 7/02; G01L 7/043; G01L 7/086; G01L 7/104; G01L 9/0022; G01L 9/0035; G01L 9/18

USPC .................................................. 73/700–756

See application file for complete search history.

(56) References Cited

U.S. PATENT DOCUMENTS

| 2014/0190237 | A1 | 7/2014 | Park et al. | |
|---|---|---|---|---|
| 2021/0010892 | A1* | 1/2021 | Walter | G01L 9/12 |
| 2021/0199529 | A1* | 7/2021 | Walter | G01L 27/007 |
| 2022/0412817 | A1* | 12/2022 | Maurus | G01L 1/142 |

FOREIGN PATENT DOCUMENTS

| EP | 2606330 B1 * | 9/2014 | G01L 25/00 |
|---|---|---|---|
| WO | WO-2020025520 A1 * | 2/2020 | |

* cited by examiner

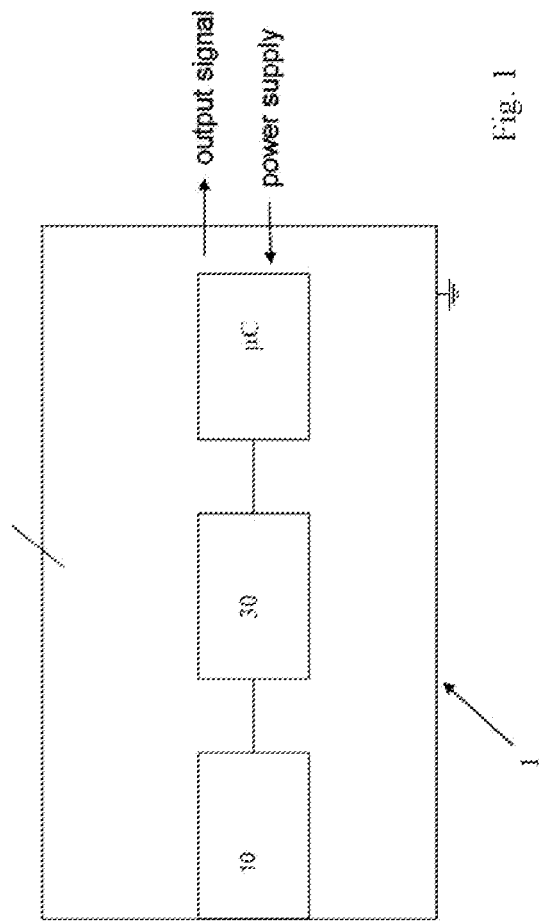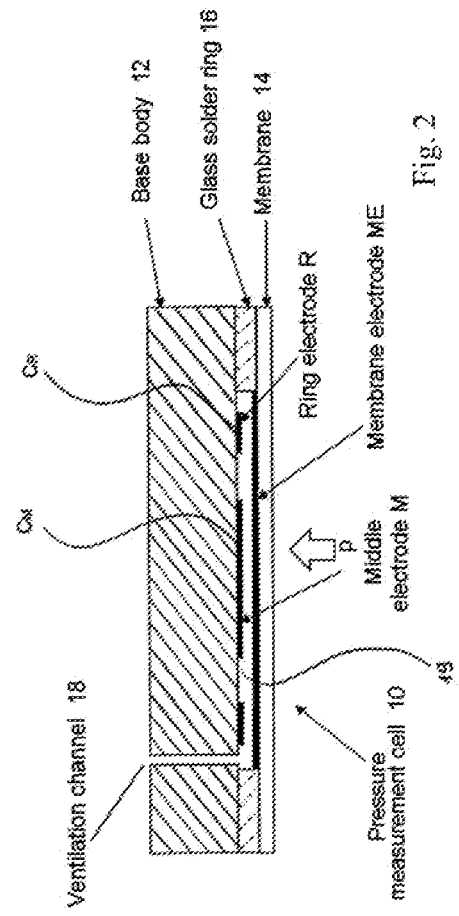

METHOD FOR OPERATING A PRESSURE MEASURING CELL OF A CAPACITIVE PRESSURE SENSOR

CROSS REFERENCE TO RELATED PATENT APPLICATIONS

This application claims priority to German Patent Application 10 2022 105 693.7 filed on Mar. 10, 2022 entitled "Verfahren zum Betreiben einer Druckmesszelle eines kapazitiven Drucksensors" (Method For Operating a Pressure Measuring Cell of a Capacitive Pressure Sensor) by Simon Bichele et al., the entire disclosure of which is incorporated herein by reference in its entirety.

BACKGROUND OF THE INVENTION

1. Field of the Invention

This invention relates generally to pressure sensors, and more specifically to a method for operating a pressure measuring cell of a capacitive pressure sensor.

2. Description of Related Art

Capacitive pressure sensors, or pressure measuring devices, are used in many areas of industry for pressure measurement. They frequently have a ceramic pressure measuring cell as a transducer for the process pressure, and evaluation electronics for signal processing.

Capacitive pressure measuring cells have a ceramic base body and a membrane, with a glass solder ring arranged between the base body and the membrane. The resultant cavity between the base body and the membrane facilitates longitudinal mobility of the membrane due to a pressure influence. This cavity is therefore also referred to as a measurement chamber. On the underside of the membrane and on the opposite top of the base body, there is provision for respective electrodes, which together form a measuring capacitor. The action of pressure leads to a deformation of the membrane, resulting in a change of capacitance in the measuring capacitor.

An evaluation unit is used to record the change of capacitance and to convert it into a pressure measured value. These pressure sensors are generally used for monitoring or controlling processes. They are therefore frequently connected to superordinate control units (PLCs).

German patent DE 198 51 506 C1 discloses a capacitive pressure sensor in which the pressure measured value is determined from the quotient of two capacitance values, relating to a measuring capacitor and a reference capacitor. Although this patent specification does not specifically describe a pressure measuring cell, the circuit shown and the method described are suitable for capacitive pressure measuring cells. The particular feature of this pressure measuring device is that only the amplitude of the square-wave signal, regardless of the frequency thereof, is relevant for evaluating the measurement signal at the output, as a measure of the recorded pressure measured value.

European Patent EP 0 569 573 BI discloses a circuit arrangement for a capacitive pressure sensor that likewise involves the use of a quotient method for pressure evaluation. Quotient methods are generally based on the following pressure dependencies:

$$p \sim \frac{C_R}{C_M} \text{ and/or } p \sim \frac{C_R}{C_M} - 1 \text{ or } p \sim \frac{C_M - C_R}{C_M + C_R},$$

where $C_M$ denotes the capacitance of the measuring capacitor. $C_R$ denotes the capacitance of the reference capacitor and p denotes the process pressure to be ascertained. There is also conceivably the option of interchanging $C_M$ and $C_R$ in the quotient. However, the indicated example with $C_M$ in the denominator is the most common form for the benefit of self-linearization. This embodiment is therefore assumed below, unless indicated otherwise.

Due to production tolerances, capacitive evaluation requires both offset compensation and gain adjustment at the factory so that the pressure sensor, or the evaluation circuit therein, also provides a process value that corresponds to the measured pressure in the rated pressure range.

It is known practice, for example from the cited German patent DE 198 51 506 C1, to perform a comparison by way of laser trimming for certain resistors, which is increasingly found to be too complex. Furthermore, an increasing relocation of analogue function blocks to a microcontroller gives rise to a need to optimize the offset compensation and gain adjustment further.

An object of the present invention is a simple and immune electronic architecture for offset compensation and gain adjustment in the pressure measuring cell of a capacitive pressure sensor that was described at the outset. This object is achieved by a method having the features of claim 1. Advantageous configurations of the invention are specified in the subclaims and further defined and envisioned herein.

BRIEF SUMMARY OF THE INVENTION

A method for operating a pressure measuring cell of a capacitive pressure sensor, wherein the pressure measuring cell comprises a pressure-dependent measuring capacitor ($C_M$) and a reference capacitor ($C_R$), which have an internal excitation voltage $U_{E0}$ applied to them in the form of an alternating square-wave signal, and the pressure measured value p is obtained from the capacitance values of the measuring capacitor ($C_M$) and the reference capacitor ($C_R$), wherein the measurement signal is supplied in the form of an alternating square-wave signal $U_R$ to an evaluation unit, the pulse level of said signal being dependent on the quotient of the capacitance values of the reference capacitor ($C_R$) and the measuring capacitor ($C_M$) and the period duration of said signal being determined by way of the capacitance value of the measuring capacitor ($C_M$), wherein the alternating square-wave signal $U_R$ is supplied to an amplifier unit (VE) for the purpose of signal amplification and offset correction, the signal amplification being performed by means of an amplitude adjustment for the internal excitation voltage $U_{E0}$ and the offset compensation being performed by way of a further square-wave signal $U_{OF}$, and in that respective fixed voltage values have been stored in a memory unit in a comparison procedure for the purpose of gain and offset correction, wherein these stored voltage values together with a predefined clock are used to form the two square-wave signals $U_{E0}$ and $U_{OF}$ and wherein the gain correction is performed by way of the multiplicative influencing of the quotient of the capacitance values of the reference capacitor ($C_R$) and the measuring capacitor ($C_M$), and the offset correction is performed by virtue of the square-wave signal $U_{OF}$ being supplied to the amplifier unit (VE) and thus being added to the square-wave signal $U_R$.

BRIEF DESCRIPTION OF THE DRAWINGS

The invention is explained by way of example with reference to the attached drawings based on preferred exemplary embodiments, wherein the features shown below both individually and in combination may represent an aspect of the invention. In the drawings:

FIG. 1 shows a block diagram of a capacitive pressure measuring device;

FIG. 2 shows a schematic sectional representation of a capacitive pressure measuring cell;

Figure 3:
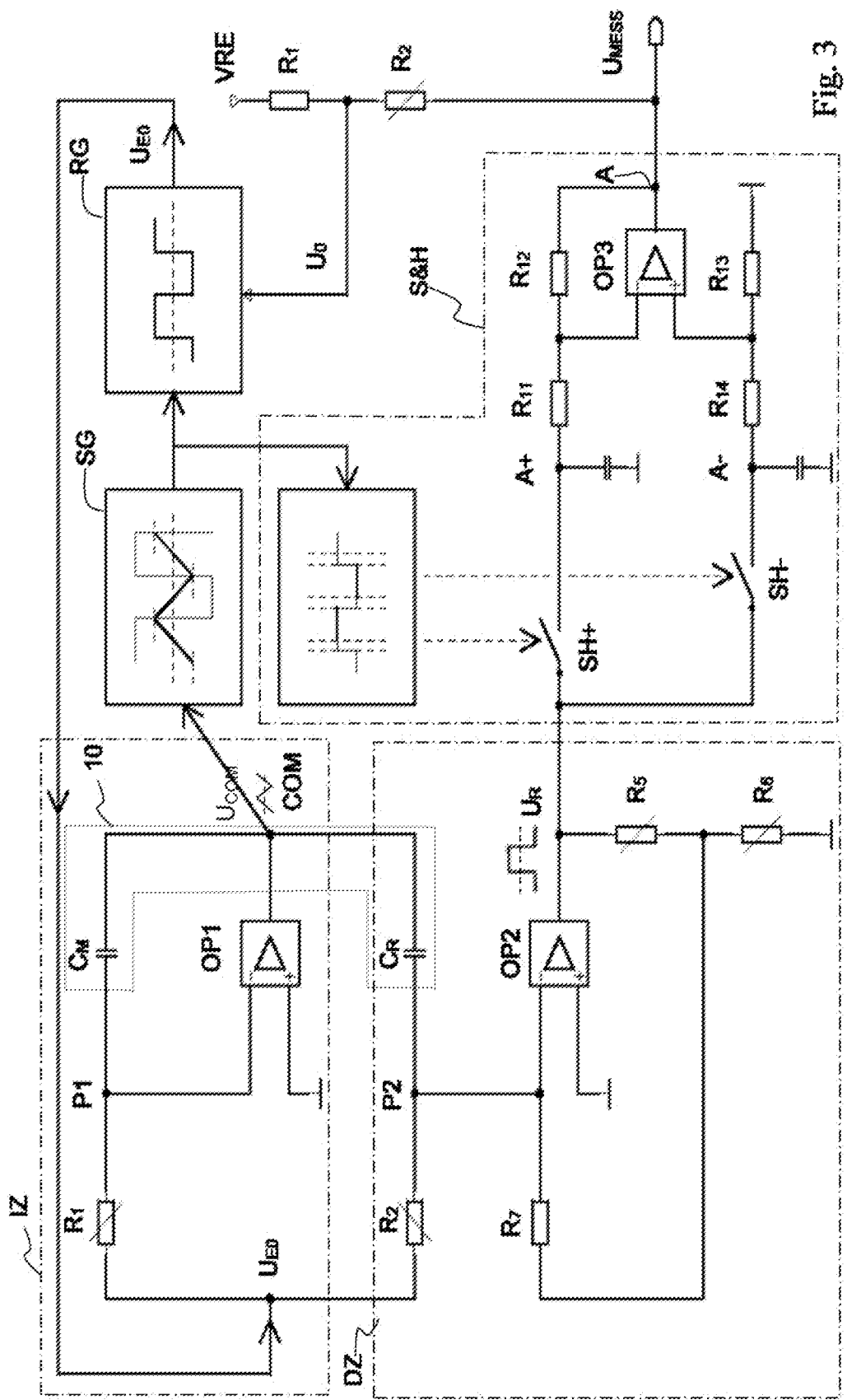
FIG. 3 shows a known evaluation circuit for a capacitive pressure measuring cell as shown in FIG. 2.

In the description of the preferred embodiments that follows, identical reference signs denote identical or comparable components.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification and the attached drawings and claims.

DESCRIPTION OF THE PREFERRED EMBODIMENTS

For a general understanding of the present invention, reference is made to the drawings. The present invention will be described by way of example, and not limitation. Modifications, improvements and additions to the invention described herein may be determined after reading this specification and supporting claims and viewing the accompanying drawings; such modifications, improvements, and additions being considered included in the spirit and broad scope of the present invention and its various embodiments described or envisioned herein.

The present invention relates to a method for operating a pressure measuring cell of a capacitive pressure sensor.

The present invention builds and improves upon the basic circuit depicted in German patent DE 198 51 506 C1, which was cited at the outset, for evaluating capacitive pressure measuring cells that comprise a pressure-dependent measuring capacitor and an ideally pressure-independent reference capacitor. The essential feature of this evaluation circuit is that the pressure measuring cell has an internal excitation voltage $U_{E0}$ applied to it in the form of an alternating square-wave signal, and the pressure measured value p is obtained from the capacitance values of the measuring capacitor and the reference capacitor. This measurement signal is then supplied in the form of an alternating square-wave signal $U_R$ to an evaluation unit, in which the measurement signal is conditioned for a superordinate control unit, for example a PLC. The pulse level, or amplitude, of said signal is dependent on the quotient of the capacitance values of the reference capacitor and the measuring capacitor, and the period duration of said signal is determined by way of the capacitance value of the measuring capacitor.

The difference compared to the existing circuit is a fundamentally different comparison architecture and thus affords various advantages.

According to the invention, the alternating square-wave signal $U_R$ is supplied to a further amplifier unit for the purpose of signal amplification and offset correction, the signal amplification firstly being performed by means of an amplitude adjustment for the internal excitation voltage $U_{E0}$ and the offset compensation secondly being performed by way of a further square-wave signal $U_{OF}$. Respective fixed voltage values have previously been stored in a memory unit in a comparison procedure for the purpose of gain and offset correction. These stored voltage values together with a predefined clock are used to form the two square-wave signals $U_{E0}$ and $U_{OF}$. Finally, the gain correction, firstly, is performed by way of the multiplicative influencing of the quotient of the capacitance values of the reference capacitor and the measuring capacitor, and the offset correction, secondly, is performed by virtue of the square-wave signal $U_{OF}$ being supplied to the further amplifier unit and thus being added to the square-wave signal $U_R$.

The capacitive pressure sensor advantageously includes a microcontroller, in which, among other things, the clock generation and measured value conditioning take place.

In a development of the invention, there is provision for the clock for forming the two square-wave signals $U_{E0}$ and $U_{OF}$ to be excited by way of a timer, which is preferably incorporated in the microcontroller. The timer preferably controls a changeover unit, which is used to form the clock for the two square-wave signals $U_{E0}$ and $U_{OF}$.

In another development of the invention, there is provision for the amplitudes of the two square-wave signals $U_{E0}$ and $U_{OF}$ to be adjusted by way of a respective digital potentiometer, these being actuated via a serial data bus that connects the two potentiometers to the microcontroller.

The type of gain adjustment can be applied for all sensor elements in which the signal swing is dependent on the sensor current flow. This also applies to differentially operating sensor elements and in particular to resistive measuring bridges: half-bridge (voltage divider) or full bridge (Wheatstone Bridge).

The offset correction for a differentially operating measuring element can be applied (added) to the single-ended process value when the offset correction signal has the same signal shape as the measuring element current flow.

The present invention affords several advantages. One advantage of the novel comparison architecture is the low sensitivity to interference, since connecting lines can be designed to be low impedance, depending on the architecture. In addition, the circuit is very robust toward environmental influences and ageing, as a result of the number of electronic components having been reduced to the maximum extent. Added to this is a cost and space saving. A further advantage is that the adjustment of the gain in the course of the change of measuring element current flow allows manufacture-related tolerances of the pressure measuring cell to be brought into line with one another, and this ensures a defined signal-to-noise ratio. Finally, the fact that the gain setting is independent of the offset setting should also be mentioned. That is to say that an offset correction has no influence on a previously set gain. Conversely, after a gain change, the offset correction needs to be changed again, since the offset compensation requirement of the pressure measuring cell is increased as well. Moreover, it is also possible for the gain and offset settings to now be placed further away from the pressure measuring cell without signal quality suffering. This is useful e.g. when there is a high temperature in the region of the pressure measuring cell or in cramped conditions.

The present invention is explained in more detail below on the basis of exemplary embodiments with reference to the drawings.

FIG. 1 shows a block diagram of a typical capacitive pressure measuring device that is used to measure a process pressure p (e.g. of oil, milk, water, etc.). The pressure measuring device 1 is embodied as a two-conductor device and includes a pressure measuring cell 10 and evaluation electronics 20. The evaluation electronics 20 comprise an analogue evaluation circuit 30 and a microcontroller μC, in which the analogue output signal from the evaluation circuit 20 is digitized and processed further. The microcontroller μC provides the evaluation result in the form of a digital or analogue output signal e.g. to a PLC. For the supply of power, the pressure measuring device 1 is connected to a power supply line (12-36 V).

FIG. 2 shows a typical capacitive pressure measuring cell 10, as is commonly used in capacitive pressure measuring devices, in a schematic representation. The pressure measuring cell 10 essentially comprises a base body 12 and a membrane 14, which are connected to one another via a glass solder ring 16. The base body 12 and the membrane 14 delimit a cavity 19, which—preferably only in low pressure ranges up to 50 bar—is connected to the back of the pressure measuring cell 10 via a ventilation channel 18.

There is provision both on the base body 12 and on the membrane 14 for multiple electrodes that form a reference capacitor $C_K$ and a measuring capacitor $C_M$. The measuring capacitor $C_M$ is formed by the membrane electrode ME and the middle electrode M, and the reference capacitor $C_K$ is formed by the ring electrode R and the membrane electrode ME.

The process pressure p acts on the membrane 14, which flexes to a greater or lesser degree according to the applied pressure, with essentially the distance from the membrane electrode ME to the middle electrode M changing. This leads to a corresponding change of capacitance in the measuring capacitor $C_M$. The influence on the reference capacitor $C_R$ is less, because the distance between the ring electrode R and the membrane electrode ME changes to a smaller degree than the distance between the membrane electrode ME and the middle electrode M.

A distinction is not drawn between the label for the capacitor and its capacitance value below. $C_M$ and $C_R$ therefore denote both the measuring or reference capacitor per se and the respective capacitance thereof.

FIG. 3 shows a known evaluation circuit 30 for the pressure measuring cell 10 in more detail. The measuring capacitor $C_M$ is arranged together with a resistor $R_1$ in an integrating branch IZ and the reference capacitor $C_R$ is arranged together with a resistor $R_2$ in a differentiating branch DZ. The input of the integrating branch IZ has a square-wave voltage $U_{E0}$ applied to it, which preferably alternates symmetrically about 0 volt. The input voltage $U_{E0}$ is converted via the resistor R, and the measuring capacitor $C_M$, using an operational amplifier OP1 operating as an integrator, into a linearly rising or falling voltage signal (depending on the polarity of the input voltage), which is output at the output COM of the integrating branch IZ. The measurement point P1 is virtually connected to earth by way of the operational amplifier OP1.

The output COM is connected to a threshold comparator SG that actuates a square-wave generator RG. As soon as the voltage signal $U_{COM}$ at the output COM exceeds or falls short of a threshold, the comparator SG changes its output signal, whereupon the square-wave generator RG inverts its output voltage in each case.

The differentiating branch DZ further includes an operational amplifier OP2, a voltage divider containing the two resistors $R_5$ and $R_6$ and a feedback resistor $R_7$. The output of the operational amplifier OP2 is connected to a sample-and-hold circuit S&H. The output of the sample-and-hold circuit S&H has the measurement voltage $U_{Mess}$ applied to it, from which the process pressure p acting on the pressure measuring cell 10 is obtained.

The operation of this measuring circuit is explained in more detail below. The operational amplifier OP1 ensures that the connecting point P1 between the resistor $R_1$ and the measuring capacitor $C_M$ is virtually kept at earth. As a result, a constant current $I_1$ flows via the resistor $R_1$, which charges the measuring capacitor $C_M$ until the square-wave voltage $U_{E0}$ changes its arithmetic sign.

It can be seen from FIG. 3 that, if $R_1=R_2$ and $C_M=C_R$, the measurement point P2 in the differentiating branch DZ is at the same potential as the measurement point P1, that is to say at earth level, even if the connection between the measurement point P2 and the operational amplifier OP2 were not present. This applies not only in this specific case, but rather whenever the time constants $R_1*C_M$ and $R_2*C_R$ are identical to one another. The null point comparison results in this state being accordingly set via the variable resistors R, and $R_2$. If the capacitance of the measuring capacitor $C_M$ changes as a result of the effect of pressure, the condition of the time constants in the integrating branch IZ and in the differentiating branch DZ being identical no longer exists and the potential at the measurement point P2 would differ from the value zero. This change is opposed directly by the operational amplifier OP2, however, since the operational amplifier OP2 continues to virtually keep the connecting point P2 at earth. The output of the operational amplifier OP2 therefore has a square-wave voltage $U_R$ applied to it, the amplitude of which is dependent on the quotient of the two time constants. It can easily be shown that the amplitude is directly proportional to the process pressure $p \sim C_R/C_M-1$, the dependency being substantially linear. The amplitude can be set via the voltage divider formed by the two resistors $R_5$ and $R_6$.

A sample&hold circuit S&H is used to add the absolute values of the positive and negative amplitudes A+ and A− of the square-wave signal, to output the absolute value A at the output of the operational amplifier OP3 as the measurement voltage $U_{Mess}$ and to forward it to the microcontroller μC (not shown). This could also be output directly as an analogue value, however. The amplitude of the input voltage Ugo applied to the output of the square-wave generator RG is set on the basis of the measurement voltage $U_{Mess}$, in order to achieve better linearity. For this purpose, there is provision for a voltage divider using the resistors $R_{20}$ and $R_{10}$. This voltage divider is connected to a reference voltage VREF and is advantageously comparable.

Typically, the positive operating voltage V+ is +2.5 V and the negative operating voltage V− is −2.5 V.

Figure 4:
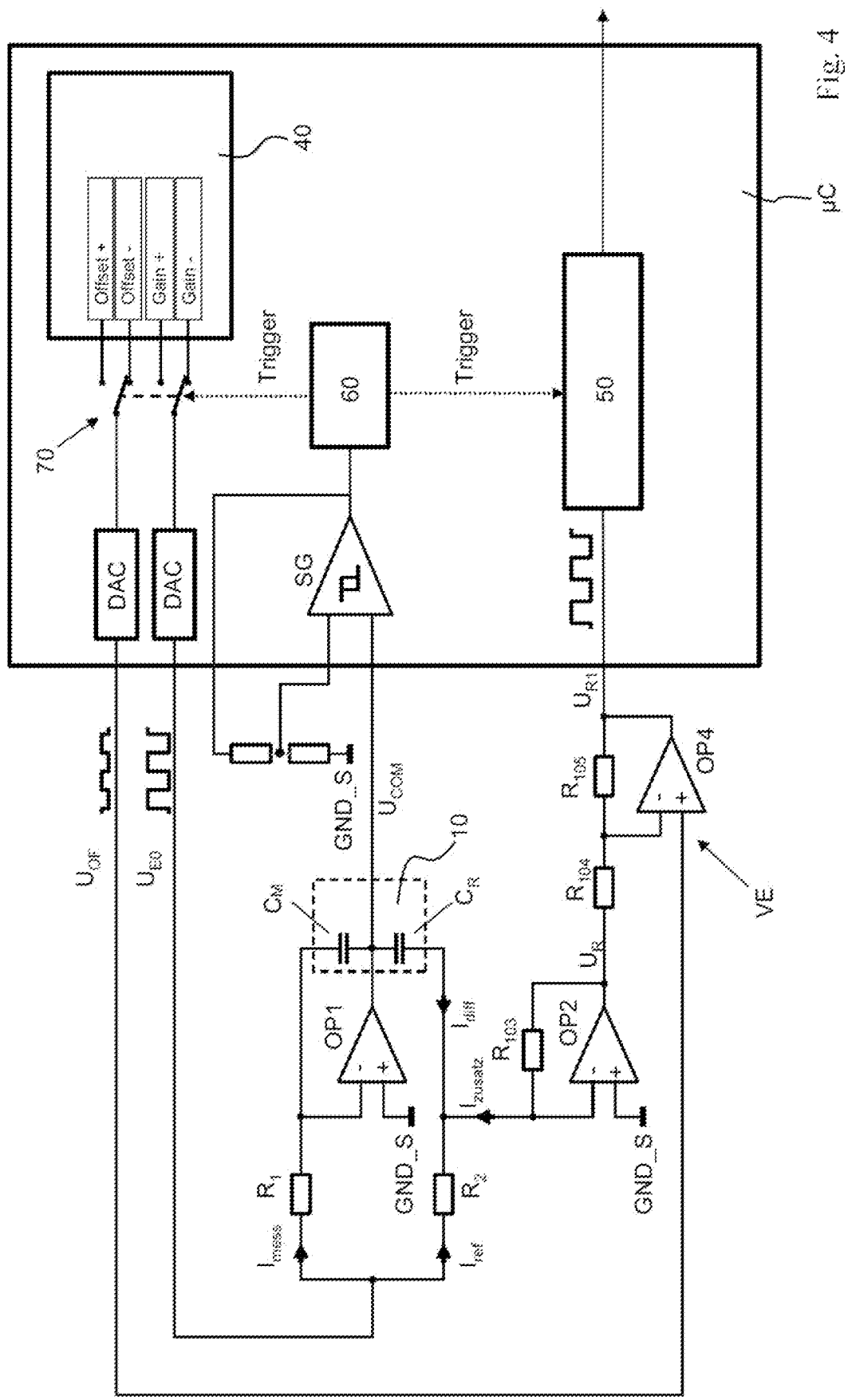
FIG. 4 shows the evaluation circuit from FIG. 3, to which a microcontroller for performing a first embodiment of the method according to the invention has been added.

FIG. 4 shows a first embodiment of the invention. The essential manner of operation corresponds to that previously explained with reference to FIG. 3. The square-wave signal $U_{E0}$, which is symmetrical with respect to the reference-earth potential GND_S, is used to charge and discharge the two cell capacitances $C_M$ and $C_R$. Since the two operational amplifiers OP1 and OP2 control the potential GND_S at their negative inputs, the currents $I_{mess}$ and $I_{ref}$ are defined by $I_{mess}=U_{E0}/R_1$ and $I_{ref}=U_{E0}/R_2$. Since the operational amplifier OP1 with the capacitance $C_M$ in the feedback path acts as an integrator, a triangular-waveform voltage $U_{COM}$ forms at the output thereof. This triangular-waveform voltage in turn acts on the capacitance $C_R$, whereupon a current $I_{diff}$ in the form of a square-wave signal forms in this path. Since the operational amplifier OP2 constantly controls the potential at its negative input to GND_S with the current $I_{zusatz}$, a voltage $U_R$ that behaves in proportion to the ratio $C_R/C_M$ forms at its output.

A new aspect is now the amplifier circuit VE, which includes the operational amplifier OP4 and the resistors $R_{104}$ and $R_{105}$. The amplifier circuit VE has two functions: firstly the signal $U_R$ is amplified and secondly a signal $U_{OF}$ is added.

$U_{OF}$ is generated in the same way as the internal excitation signal $U_{E0}$. The clock for the two square-wave signals $U_{E0}$ and $U_{OF}$ is excited by a timer 60, which is in turn fed by the threshold comparator SG known from FIG. 3. The two signals $U_{E0}$ and $U_{OF}$ therefore have the same frequency. The timer 60 uses said clock to control a changeover unit 70, which may be embodied as a multiplexer, for example. The changeover unit 70 influences the activation of voltage values stored in a memory unit 40. These voltage values comprise various fixed positive and negative gain and offset correction values and have been ascertained in a prior comparison procedure and stored in the memory unit 40. As can be seen from FIG. 4, the changeover unit 70 uses the clock for $U_{E0}$ and $U_{OF}$, as predefined by the timer 60, to generate a respective square-wave signal having variable amplitudes. A respective digital-to-analog converter (DAC) is used to output the two square-wave signals $U_{E0}$ and $U_{OF}$ as an analog signal and, in the case of $U_{E0}$, to supply it to the capacitances $C_M$ and $C_R$ of the pressure measuring cell 10, or, in the case of $U_{OF}$, to supply it to the aforementioned amplifier circuit VE, i.e. the operational amplifier OP4.

It has already been explained above that the amplifier circuit VE amplifies the signal $U_R$ and adds the signal $U_{OF}$. The result is denoted as $U_{R1}$ in FIG. 4, and is then conditioned in the microcontroller µC and the CPU 50 located therein and provided for further use at an output of the microcontroller µC.

The transfer function below reveals how $U_{E0}$ multiplicatively affects the ratio $C_R/C_M$—and can therefore be used as a manipulated variable for the gain setting of the sensor system—and the signal $U_{OF}$, by contrast, is applied additively to the useful signal—and can therefore be used as a manipulated variable for an offset compensation:

$$U_{R1}(U_{E0}, U_{OF}) = R_{108} * \frac{R_{10B}}{R_{104}} * \left(\frac{C_R}{C_M} * \frac{1}{R_1} - \frac{1}{R_2}\right) * U_{E0} + \left(1 + \frac{R_{10B}}{R_{104}}\right) * U_{OF}$$

A negative offset shift can be achieved by operating the phase of the $U_{OF}$ signal in a manner inverted with respect to the phase of the $U_{E0}$ signal.

Figure 5:
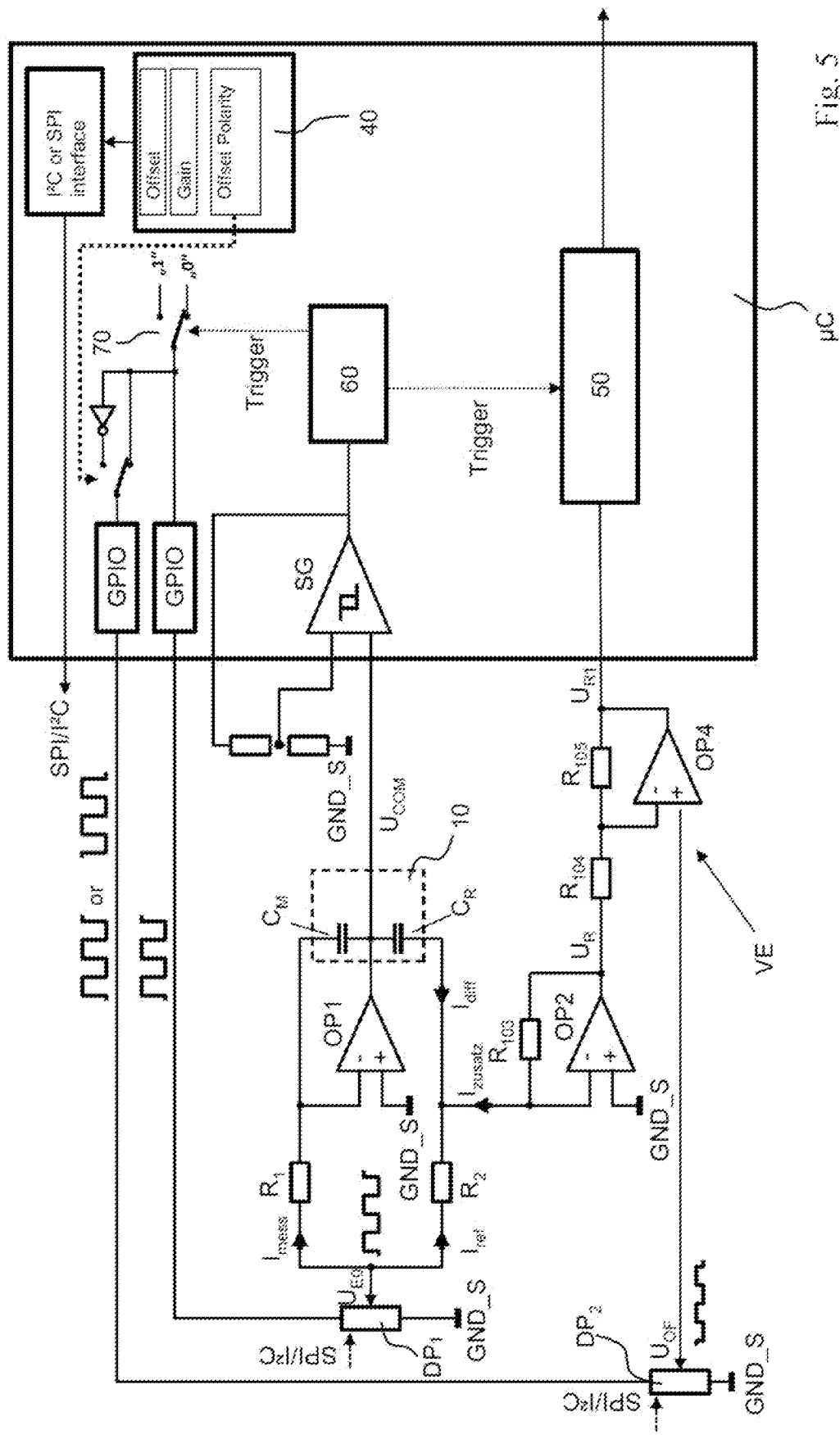
FIG. 5 shows the evaluation circuit from FIG. 3, to which a microcontroller for performing a second embodiment of the method according to the invention has been added.

FIG. 5 shows a second embodiment of the invention. In contrast to the embodiment shown in FIG. 4, the two square-wave signals $U_{E0}$ and $U_{OF}$ are not already generated in the microcontroller µC, but rather by a respective digital potentiometer DP1, DP2 situated outside the microcontroller µC. The two potentiometers DP1, DP2 are actuated, and therefore the amplitude adjustment is performed, via a serial data bus that connects the two potentiometers $DP_1$, $DP_2$ to the microcontroller µC. The serial data bus can be embodied as an I²C or SPI communication protocol, for example.

The changeover device 70 controlled by the timer 40 now comprises only one switch, which is merely changed over between "High" and "Low", or "0" and "1", in accordance with the predefined clock. A further switch is provided for the polarity of the offset correction value and is actuated directed from the memory 40, as represented by the dashed line. Besides the offset polarity, the memory 40 also stores the voltage values required for the desired gain or offset correction.

The digital clock signals are now output via a GPIO (General Purpose Input/Output) port and supplied to the two potentiometers DP1, DP2, which use this digital clock signal together with the amplitude values transmitted via the serial data bus to generate the respective analogue square-wave signal $U_{E0}$ and $U_{OF}$ known from FIG. 4.

LIST OF REFERENCE SIGNS 1 pressure measuring device
10 pressure measuring cell
12 base body
14 membrane
16 glass solder ring
18 ventilation channel
19 cavity
20 evaluation electronics
30 evaluation circuit
40 memory
50 central processing unit. CPU
60 timer
70 changeover unit
$C_M$ measuring capacitor
$C_R$ reference capacitor
M middle electrode
R ring electrode
ME membrane electrode
IZ integrating branch
DZ differentiating branch
SG threshold value comparator
RG square-wave generator
VE amplifier unit
$DP_1$ digital potentiometer
$DP_2$ digital potentiometer While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification and the attached drawings and claims.

What is claimed is:

1. A method for operating a pressure measuring cell (10) of a capacitive pressure sensor (1); wherein the pressure measuring cell (10) comprises a pressure-dependent measuring capacitor ($C_M$) and a reference capacitor ($C_R$), which have an internal excitation voltage $U_{E0}$ applied to them in the form of an alternating square-wave signal, and the pressure measured value p is obtained from the capacitance values of the measuring capacitor ($C_M$) and the reference capacitor ($C_R$);

wherein the measurement signal is supplied in the form of an alternating square-wave signal $U_R$ to an evaluation unit, the pulse level of said signal being dependent on the quotient of the capacitance values of the reference capacitor ($C_R$) and the measuring capacitor ($C_M$) and the period duration of said signal being determined by way of the capacitance value of the measuring capacitor ($C_M$), characterized in that the alternating square-wave signal $U_R$ is supplied to an amplifier unit (VE) for the purpose of signal amplification and offset correction, the signal amplification being performed by means of an amplitude adjustment for the internal excitation voltage $U_{E0}$ and the offset compensation being performed by way of a further square-wave signal $U_{OF}$;

and in that respective fixed voltage values have been stored in a memory unit (40) in a comparison procedure for the purpose of gain and offset correction;

wherein these stored voltage values together with a predefined clock are used to form the two square-wave signals $U_{E0}$ and $U_{OF}$;

and wherein the gain correction is performed by way of the multiplicative influencing of the quotient of the capacitance values of the reference capacitor ($C_R$) and the measuring capacitor ($C_M$), and the offset correction is performed by virtue of the square-wave signal $U_{OF}$ being supplied to the amplifier unit (VE) and thus being added to the square-wave signal $U_R$.

2. The method according to claim 1, wherein the pressure sensor (1) includes a microcontroller (μC).

3. The method according to claim 1, wherein the clock for forming the two square-wave signals $U_{E0}$ and $U_{OF}$ is excited by way of a timer (60).

4. The method according to claim 2, wherein the clock for forming the two square-wave signals $U_{E0}$ and $U_{OF}$ is excited by way of a timer (60).

5. The method according to claim 3, wherein the timer (60) controls a changeover unit (70) which is used to form the clock for the two square-wave signals $U_{E0}$ and $U_{OF}$.

6. The method according to claim 2, wherein the amplitudes of the two square-wave signals $U_{E0}$ and $U_{OF}$ are adjusted by way of a respective digital potentiometer ($DP_1$, $DP_2$), these being actuated via a serial data bus that connects the two potentiometers ($DP_1$, $DP_2$) to the microcontroller (μC).

7. The method according to claim 3, wherein the amplitudes of the two square-wave signals $U_{E0}$ and $U_{OF}$ are adjusted by way of a respective digital potentiometer ($DP_1$, $DP_2$), these being actuated via a serial data bus that connects the two potentiometers ($DP_1$, $DP_2$) to the microcontroller (μC).

8. The method according to claim 4, wherein the amplitudes of the two square-wave signals $U_{E0}$ and $U_{OF}$ are adjusted by way of a respective digital potentiometer ($DP_1$, $DP_2$), these being actuated via a serial data bus that connects the two potentiometers ($DP_1$, $DP_2$) to the microcontroller (μC).

* * * * *